United States Patent
Chen et al.

(10) Patent No.: US 9,831,721 B2
(45) Date of Patent: Nov. 28, 2017

(54) CHARGING BRACKET FOR CONSUMER ELECTRONIC PRODUCT

(71) Applicant: FOXCONN INTERCONNECT TECHNOLOGY LIMITED, Grand Cayman (KY)

(72) Inventors: Chi-Ming Chen, New Taipei (TW); De-Gang Zhang, Kunshan (CN); Qing Wang, Kunshan (CN)

(73) Assignee: FOXCONN INTERCONNECT TECHNOLOGY LIMITED, Grand Cayman (KY)

( * ) Notice: Subject to any disclaimer, the term of this patent is extended or adjusted under 35 U.S.C. 154(b) by 143 days.

(21) Appl. No.: 14/645,339

(22) Filed: Mar. 11, 2015

(65) Prior Publication Data
US 2015/0263556 A1   Sep. 17, 2015

(30) Foreign Application Priority Data

Mar. 11, 2014   (CN) ..................... 2014 2 0106853 U

(51) Int. Cl.
*H02J 17/00* (2006.01)
*H02J 7/00* (2006.01)

(52) U.S. Cl.
CPC ............ *H02J 17/00* (2013.01); *H02J 7/0042* (2013.01); *H02J 2007/0062* (2013.01)

(58) Field of Classification Search
CPC .. H02J 7/025; H02J 5/005; H02J 7/355; H02J 7/0042; H02J 7/0045; H02J 7/0044
USPC ......................................................... 320/108
See application file for complete search history.

(56) References Cited

U.S. PATENT DOCUMENTS

| 7,855,529 | B2 | 12/2010 | Liu | |
|---|---|---|---|---|
| 2010/0072334 | A1* | 3/2010 | Le Gette | F16M 11/041 248/176.3 |
| 2011/0272517 | A1* | 11/2011 | Motta | B65H 75/285 242/472.7 |
| 2013/0278207 | A1* | 10/2013 | Yoo | H02J 7/025 320/108 |

FOREIGN PATENT DOCUMENTS

| KR | 20110120003 A | * 11/2011 |
|---|---|---|
| TW | M440954 | 11/2012 |

* cited by examiner

*Primary Examiner* — Drew A Dunn
*Assistant Examiner* — Sailesh Thapa
(74) *Attorney, Agent, or Firm* — Wei Te Chung; Ming Chieh Chang

(57) ABSTRACT

A charging bracket for charging a consumer electronic product includes a first end, a second end, a connecting portion connecting the first end, a second end, a connecting portion, a first connector located at the first end and cooperating with the consumer electronic product, a second connector connecting with the first connector electrically, a coil located on the connecting portion, a wired charging loop comprising the first connector and the second connector and a wireless charging loop comprising the first connector and the coil, wherein the connecting portion is bendable to lie on a plane different from a plane defined by the first end and the second end.

4 Claims, 7 Drawing Sheets

CHARGING BRACKET FOR CONSUMER ELECTRONIC PRODUCT

BACKGROUND OF THE INVENTION

1. Field of the Invention

The present invention relates generally to a charging bracket, and more particularly to a charging bracket for a consumer electronic product.

2. Description of Related Arts

U.S. Pat. No. 7,855,529, issued on Dec. 21, 2010, discloses a sleeve for receiving a mobile electronic device. The sleeve includes a winding for receiving magnetic flux from an inductive charging system, an energy processing circuit for generating a DC output voltage from the magnetic flux, and a connector for connecting the circuit to the device received within the sleeve whereby the device may be charged directly by the inductive charging system by placing the sleeve with the device therein on a surface of the inductive charging system. The sleeve may further includes an external port through which the device can be connected to a computer or another external charger. Therefore, the sleeve comprises two charging loops for two charging ways.

A charging bracket for a consumer electronic product which is convenient for use is desired.

SUMMARY OF THE INVENTION

Accordingly, an object of the present invention is to provide a charging bracket for a consumer electronic product.

To achieve the above object, a charging bracket for charging a consumer electronic product includes a first end, a second end, a connecting portion connecting the first end, a second end, a connecting portion, a first connector located at the first end and cooperating with the consumer electronic product, a second connector connecting with the first connector electrically, a coil located on the connecting portion, a wired charging loop comprising the first connector and the second connector and a wireless charging loop comprising the first connector and the coil, wherein the connecting portion is bendable to lie on a plane different from a plane defined by the first end and the second end.

Other objects, advantages and novel features of the invention will become more apparent from the following detailed description when taken in conjunction with the accompanying drawings.

DETAILED DESCRIPTION OF THE PREFERRED EMBODIMENT

Figure 1:
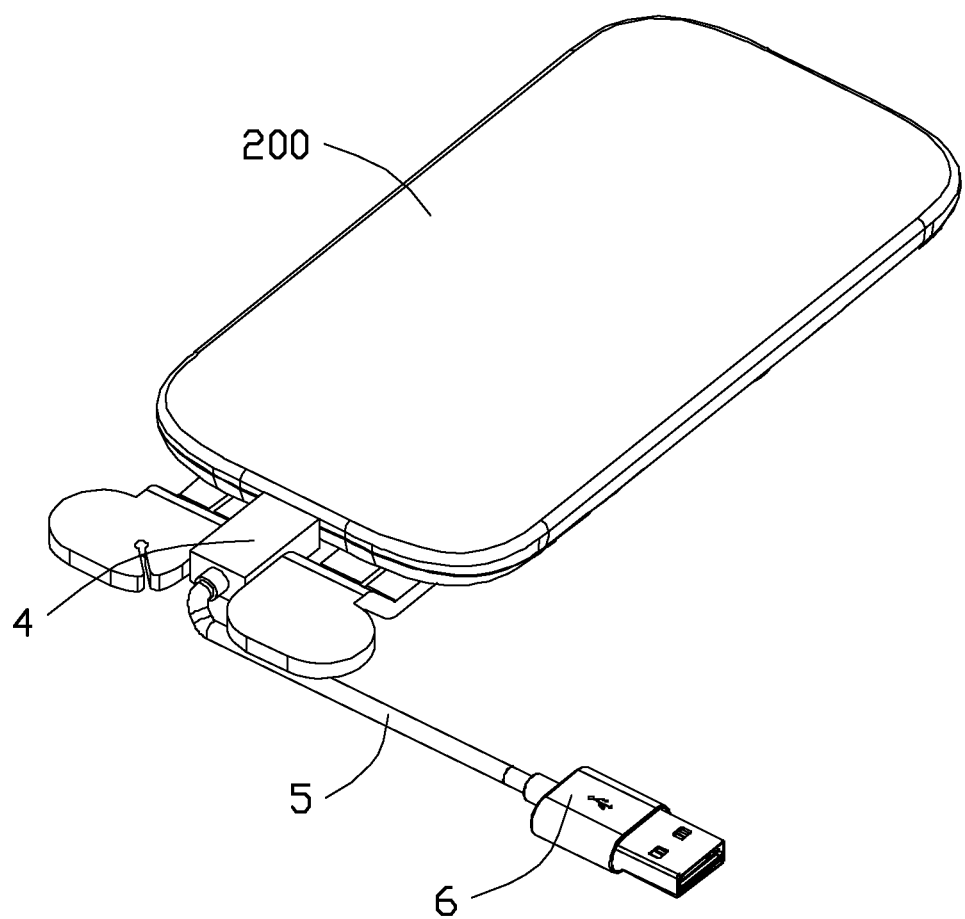
FIG. 1 is a perspective, assembled view of a consumer electronic product supported by a charging bracket of the present invention.

Reference will now be made in detail to the preferred embodiment of the present invention.

Referring to FIGS. 1 to 4, a charging bracket 100 of the present invention can charge for a consumer electronic product 200, such as a mobile phone and a pad, by wired or wireless charging.

Referring to FIGS. 2 to 7, the charging bracket 100 is laminal and made of flexible material. The charging bracket 100 comprises a first end 1, a second end 2, a connecting portion 3 connecting the first end 1 and the second end 2, a first connector 4 located at the first end 1 and cooperating with the consumer electronic product 200, a second connector 6 connecting with the first connector 4 electrically, and a cable 5 connecting the first connector 4 and the second connector 6. The first end 1 comprises a first connector 4 and a first cutout 11 located at one side of the first connector 4. The second end 2 comprises a second cutout 22 and a third cutout 23. The first cutout 11 and the third cutout 23 are located at the same side of the charging bracket 100 and located at the opposite positions of the first end 1 and the second end 2 respectively.

Figure 2:
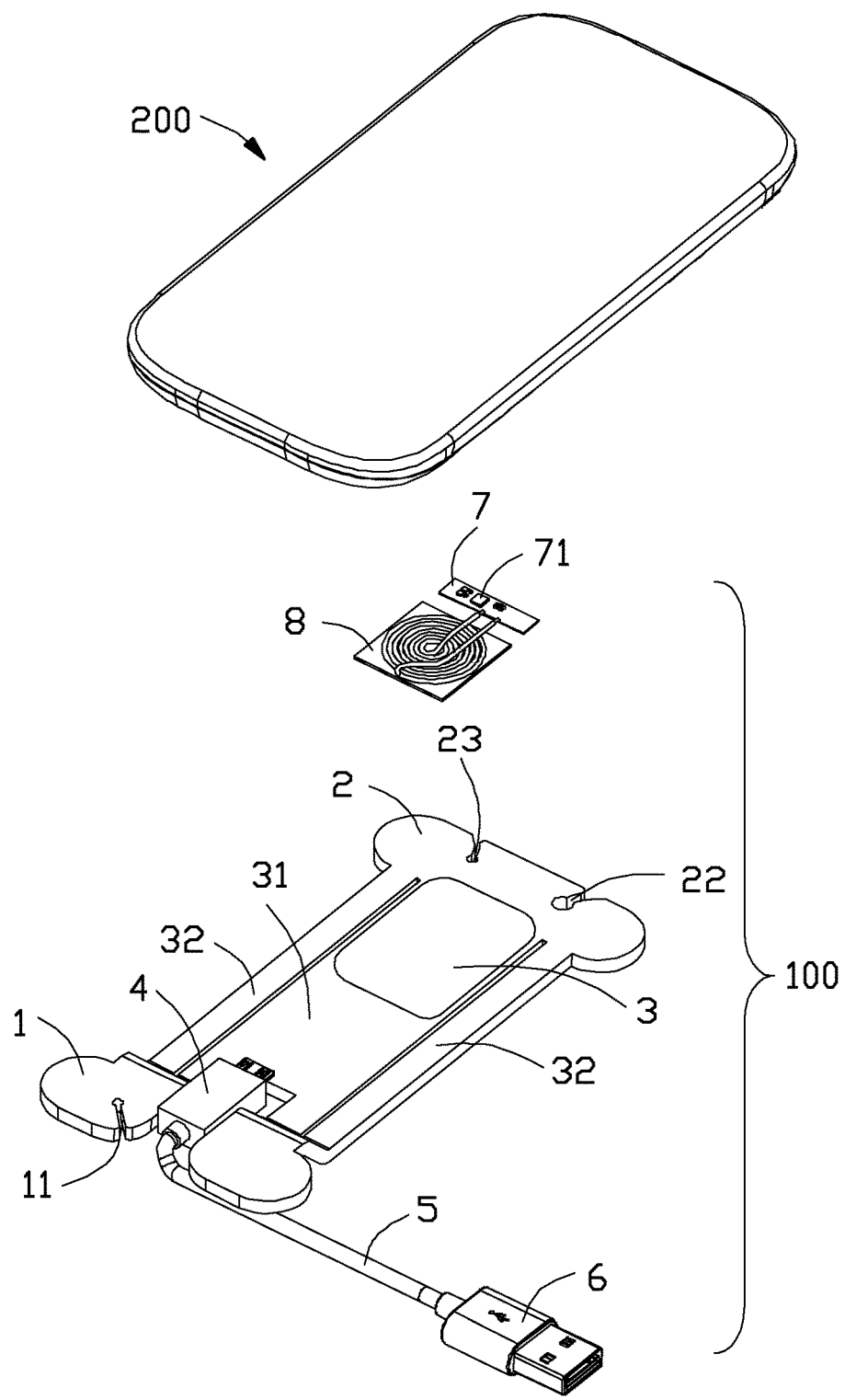
FIG. 2 is a perspective, exploded view of the charging bracket shown in FIG. 1.
Figure 3:
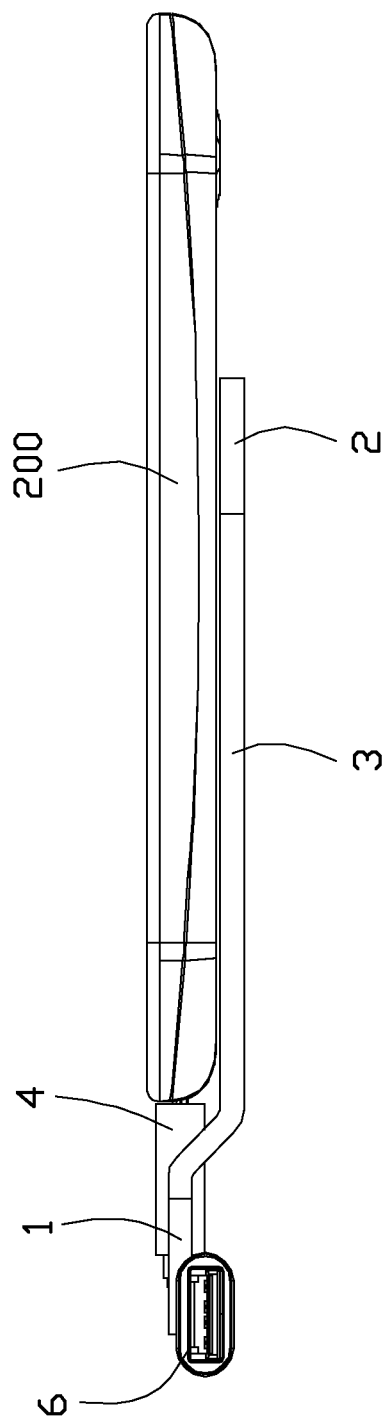
FIG. 3 is a perspective, side view of the consumer electronic product supported by the charging bracket shown in FIG. 1.
Figure 4:
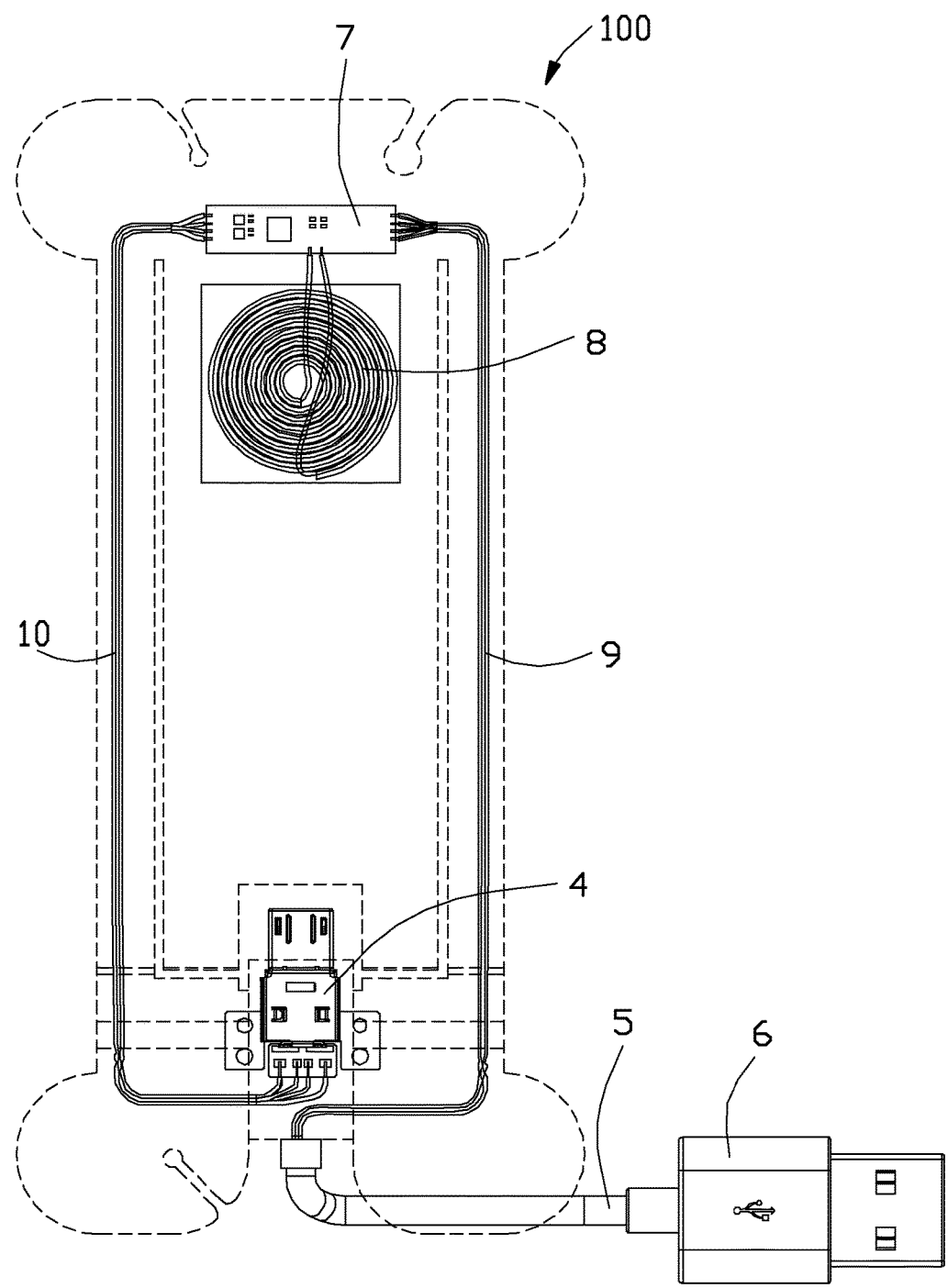
FIG. 4 is a perspective view of the charging bracket in FIG. 1.

Referring to FIGS. 2 to 4, the connecting portion 3 comprises a pair of parallel arms 32 extending from two sides of the second end 2 to the first end 1 and a supporting portion 31 extending forwardly from the middle of the second end 2. The supporting portion 31 and the pair of arms 32 are spaced. The front end of the supporting portion 31 and the first end 1 are spaced. The pair of arms 32 and the first end 1 are connected with each other. The supporting portion 31 comprises a pair of supporting arms 311 extending forwardly from the two sides of the front end thereof and a groove 312 located among the pair of the supporting arms 311.

Referring to FIGS. 2 and 4, the charging bracket 100 can charge by wired charging or wireless charging. The charging bracket 100 comprises a printed circuit board 7 located at a rear of the second end 2, a coil 8 located on the connecting portion 3, a first wire 9 connecting one end of the printed circuit board 7 and the cable 5 and a second wire 10 connecting another end of the printed circuit board 7 and the first connector 4. The first wire 9 and the second wire 10 are integrated inside the charging bracket 100 and are distributed to four round of the charging bracket 100. The coil 8 is a receiving end of the wireless charging, and receives the power from another coil (not labelled) of a transmitter of the wireless charging. The two coils of the receiving end and the transmitter transmit the power by the electromagnetic induction. The first wire 9 is located inside the first end 1, the second end 2 and one of the arms 32. The second wire 10 is located inside the first end 1, the second end 2 and another one of the arms 32. The coil 8 is located inside the supporting portion 31 of the connecting portion 3, the printed circuit board 7 is located inside the second end 2. The charging bracket 100 comprises a wired charging loop and a wireless charging loop. The wired charging loop contains the second connector 6 receiving the power, the cable 5, the first wire 9, the printed circuit board 7, the second wire 10 and the first connector 4 transferring the power to the consumer electronic product 200 in order. The wireless charging loop contains the coil 8 receiving the power from the transmitter of the wireless charging, the printed circuit board 7, the second wire 10 and the first connector 4 transferring the power to the consumer electronic product 200 in order. The printed circuit board 7 comprises a plurality of electronic component 71 controlling the wireless charging loop have a priority, when the coil 8 receives the power, the wired charging loop is broken and the wireless charging loop is going on. In another embodiment, the printed circuit board 7 comprises a plurality of electronic component 71 controlling the wired charging loop have a priority, when the second connector 6 receives the power, the wireless charging loop is broken and the wired charging loop is going on.

Figure 6:
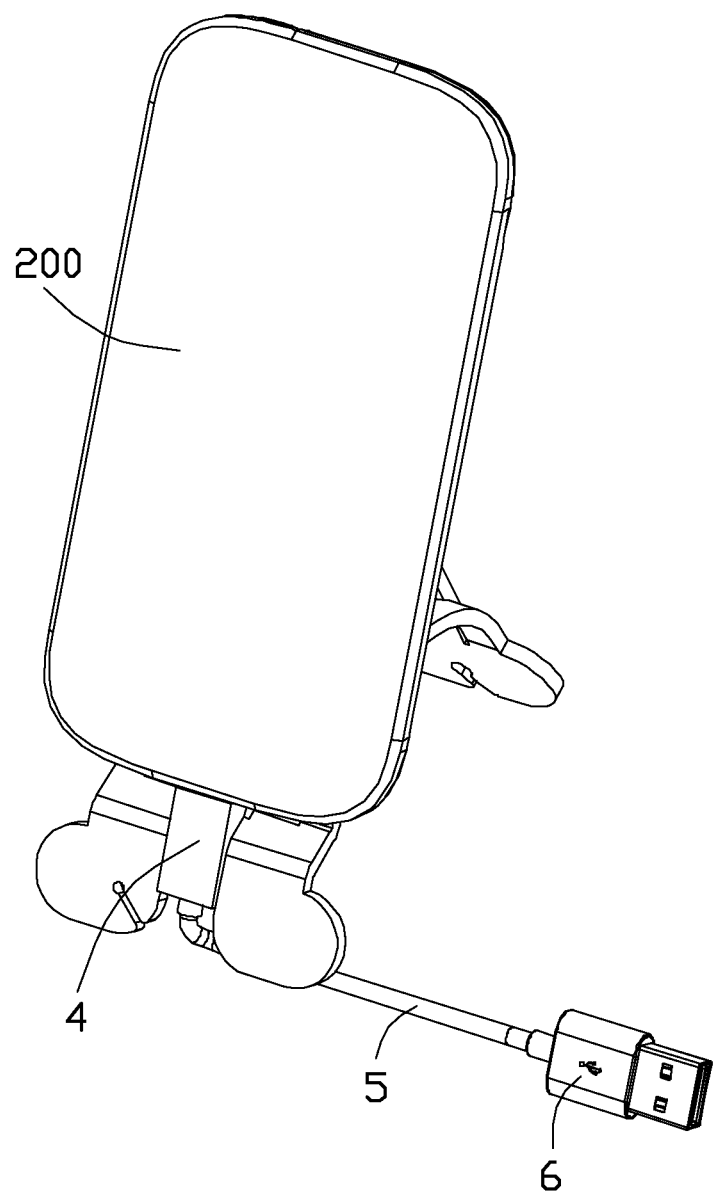
FIG. 6 is a perspective, assembled view of the consumer electronic product supported by a tucked charging bracket.
Figure 7:
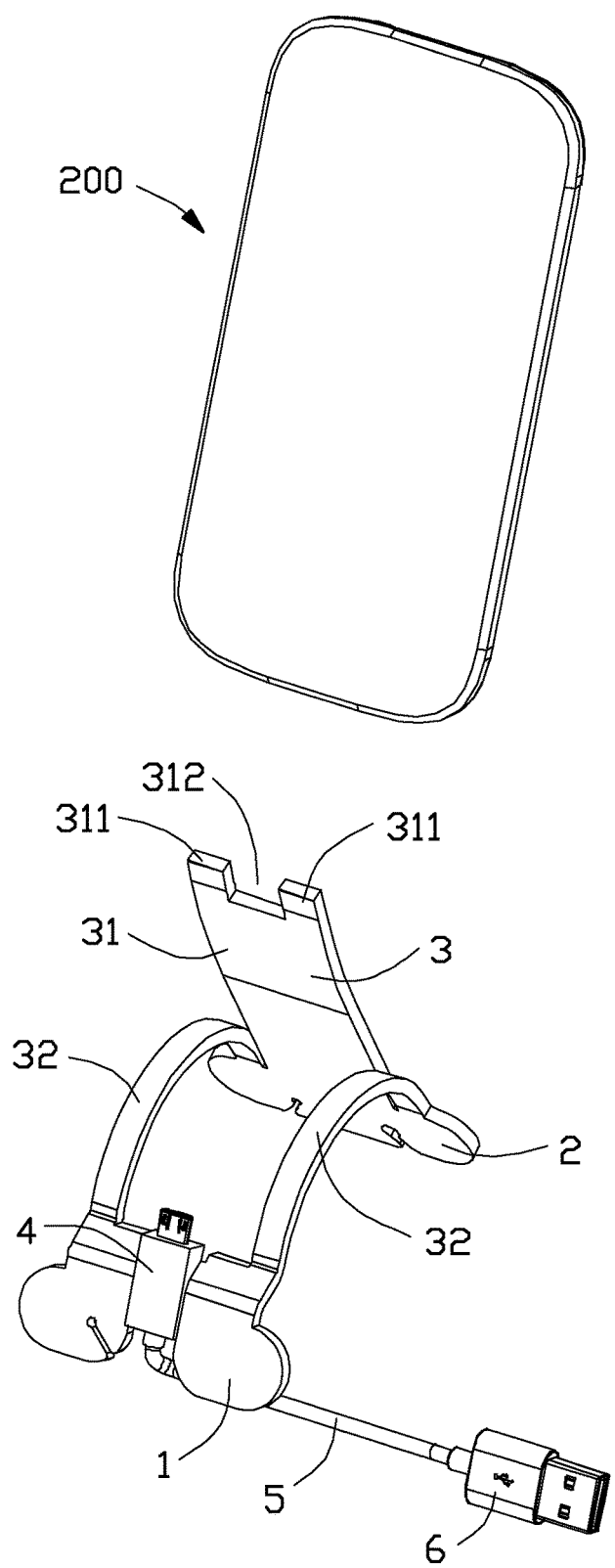
FIG. 7 is a perspective, exploded view of the consumer electronic product separated from the tucked charging bracket in FIG. 6.

Referring to FIGS. 1, 2, 6, and 7, the charging bracket 100 can support the consumer electronic product 200 using two ways. Referring to FIG. 6, the charging bracket 100 is buckled into another shape, the first end 1 and the second end 2 are coplanar, the arms 32 are bent. The supporting portion 31 and the second end 2 are formed into an inclined plane. The consumer electronic product 200 is put on the charging bracket 100 and supported by the supporting arms 311, and the first connector 4 is inserted into the corresponding port of the consumer electronic product 200. The charging bracket 100 can support the consumer electronic product 200 and the consumer electronic product 200 can be charged by wired charging. Referring to FIG. 1, the charging bracket 100 is flat, can support the consumer electronic product 200, and the consumer electronic product 200 can be charged by wired or wireless charging and also can transmit the data through the charging bracket 100.

Figure 5:
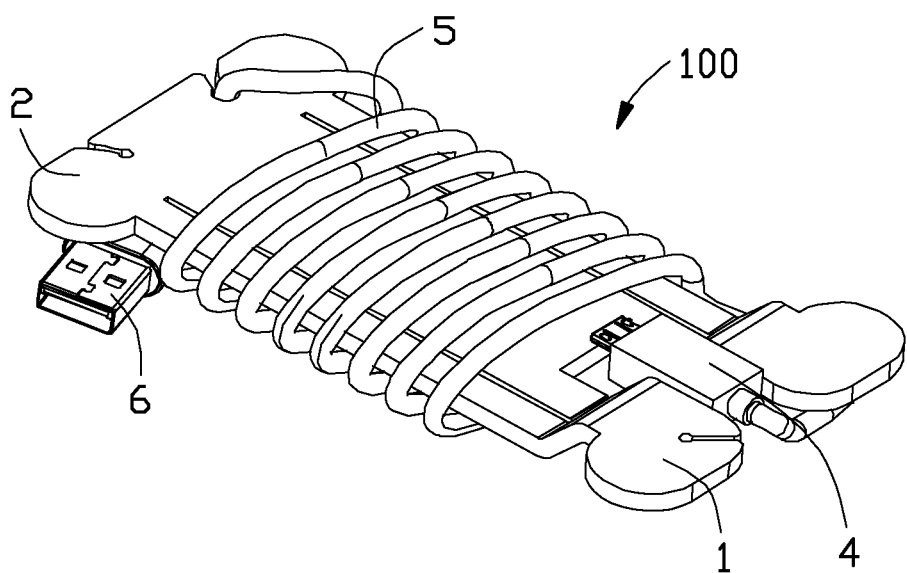
FIG. 5 is a perspective, assembled view of a cable twining around the charging bracket shown in FIG. 1.

Referring to FIG. 5, while the consumer electronic product 200 is not supported by the charging bracket 100, the charging bracket 100 can be used as a coiling tool. The cable 5 can be coiled on the connecting portion 3 and the rear end of the second connector 6 is accommodated in the second cutout 22. An earphone (not labelled), a power connector assembly (not labelled) and so on can be seized in the first cutout 21 and the third cutout 23.

The charging bracket 100 in the present invention can charge by wired charging or wireless charging and also can be used as a bracket or a coiling tool, so that the user can choose a convenient way to charge and have a good place to lay up the consumer electronic product 200 and the cable 5.

What is claimed is:

1. A charging bracket for charging a consumer electronic product, comprising:
    a first end;
    a second end;
    a connecting portion connecting the first end and the second end, the connecting portion including a pair of arms and a supporting portion between the pair of arms, the pair of arms being flexible;
    a first connector located at the first end for charging the consumer electronic product;
    a second connector connecting with the first connector electrically;
    an energy receiving coil located in the supporting portion;
    a wired charging loop comprising the first connector, a first and second wires respectively in the pair of arms, a printed circuit board (PCB) at the second end and connected between the first and second wires, and the second connector; and
    a wireless charging loop comprising the first connector, the second wire, the PCB, and the coil; wherein
    the pair of arms extend from two sides of the second end to the first end and the supporting portion extends forwardly from a middle of the second end, and the supporting portion and the pair of arms are spaced apart.

2. The charging bracket as claimed in claim 1, further comprising a cable connected to the first end and between the first wire and the second connector.

3. The charging bracket as claimed in claim 1, wherein the first end comprises a first cutout located at one side of the first connector, and the second end comprises a second cutout and a third cutout, and the first cutout and the third cutout are located at a same side of the first end and the second end, respectively.

4. The charging bracket as claimed in claim 3, wherein the cable is coiled on the connecting portion and the rear end of the second connector is accommodated in the second cutout.

* * * * *